UNITED STATES PATENT OFFICE.

ARTHUR S. HICKLEY, OF MONTREAL, QUEBEC, CANADA, ASSIGNOR, BY MESNE ASSIGNMENTS, TO THE ELECTRIC AMALGAM COMPANY OF MAINE.

SECONDARY BATTERY.

SPECIFICATION forming part of Letters Patent No. 307,461, dated November 4, 1884.

Application filed April 12, 1884. (No model.)

*To all whom it may concern:*

Be it known that I, ARTHUR SAMUEL HICKLEY, of the city of Montreal, in the District of Montreal and Province of Quebec, Dominion of Canada, have invented certain new and useful Improvements in Secondary Batteries; and I do hereby declare that the following is a full, clear, and exact description of the same.

My present invention relates to a further improvement on the secondary battery for which I made application for Letters Patent of the United States on the 2d day of November, 1883, and has for its object to construct the battery in a simpler and less expensive form, while embodying all the advantages set forth in said former invention. The improvement also provides for an increased surface upon which the amalgam of mercury and sodium is formed within a small space, while greatly lessening the internal resistance. My secondary battery as now constructed is made up of an anode of broken carbon, a cathode of mercury, a wire netting or its equivalent immersed in said mercury, and an electrolyte of chloride of sodium; but for more complete comprehension of the invention reference must be had to the accompanying drawings, in which—

Figure 1 is a plan view, partly broken away, and Fig. 2 a longitudinal section, of my battery.

Similar letters of reference indicate like parts.

A represents the battery-cell, made of glass, porcelain, stone, or granite ware or other suitable material of such shape as to give a large flat surface for the elements to rest upon, the object being to insure the greatest possible surface without taking up much room. This cell is provided with a suitable cover, B, and has also an internal ledge or projection, $a$, about half-way between top and bottom, upon which rests a grating made of wood, cane, vulcanite, or other non-conducting substance. Resting upon the bottom of the cell is a sheet of netting, D, (or its equivalent) preferably of galvanized iron, and interlaced in this netting is the bare end of the negative wire $n$. This netting D is covered by a body of mercury, E, which acts as the cathode of the battery.

On top of the grating C, I place pieces of broken carbon, F, and pack the same closely together, in order to insure perfect contact, and this acts as the anode.

$f$ is the positive pole, preferably a stick of carbon, which passes down through the carbon electrode F and forms contact therewith. To this pole is attached the positive wire $p$. The electrolyte permeates the entire cell, and is of chloride of sodium in solution or as a paste, the former, however, being preferred.

To charge my battery a current is brought in through the wire $p$, and by decomposing the electrolyte precipitates metallic sodium into the mercury E, and an amalgam of sodium and mercury is formed upon the netting D, which, by having a number of interstices, presents a very large surface, upon which said amalgam is held. In discharging, a rapid separation of the sodium and mercury takes place, and as the sodium assimilates itself with the oxygen in the elements with the greatest ease and activity a high electro-motive force is given off through the wire $n$. This wire $n$ is bare where it passes through the netting and mercury, but is heavily insulated where it meets the carbon and electrolyte.

What I claim, and desire to secure by Letters Patent, is as follows:

In a secondary battery, the combination, with a suitable cell and line-connections, of the carbon electrode F, grating C, mercury electrode E, netting D, and an electrolyte, substantially as specified.

Signed at Boston, Massachusetts, this eighth (8th) day of April, 1884.

ARTHUR S. HICKLEY.

Witnesses:
R. A. KELLOND,
WM. PORTEOUS.

(No Model.)
A. S. HICKLEY & W. S. HILL.
SECONDARY BATTERY.
No. 307,462. Patented Nov. 4, 1884.
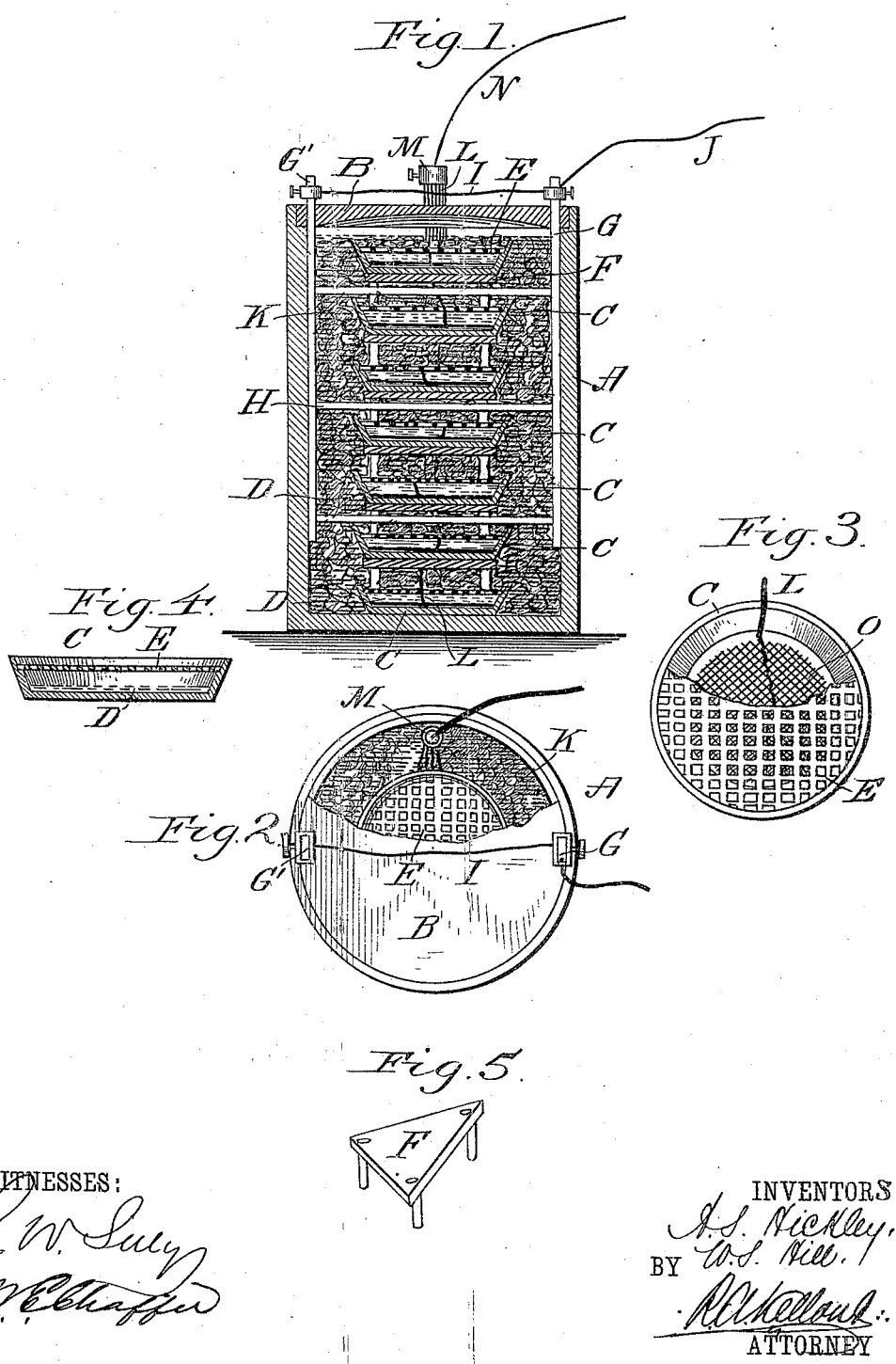

UNITED STATES PATENT OFFICE.

ARTHUR S. HICKLEY, OF MONTREAL, QUEBEC, CANADA, AND WARREN S. HILL, OF BOSTON, MASSACHUSETTS, ASSIGNORS, BY MESNE ASSIGNMENTS, TO THE ELECTRIC AMALGAM COMPANY OF MAINE.

SECONDARY BATTERY.

SPECIFICATION forming part of Letters Patent No. 307,462, dated November 4, 1884.

Application filed April 12, 1884. (No model.)

*To all whom it may concern:*

Be it known that we, ARTHUR S. HICKLEY, of the city of Montreal, in the Province of Quebec, Canada, and WARREN S. HILL, of the city of Boston, in the county of Suffolk and State of Massachusetts, one of the United States of America, have jointly invented certain new and useful Improvements in Secondary Batteries; and we do hereby declare that the following is a full, clear, and exact description of the same.

Our invention relates to secondary or storage batteries, and particularly to certain improvements upon the battery invented by Arthur S. Hickley, for which an application for Letters Patent was filed November 2, 1883, No. 110,675.

In the application referred to, the invention was described and shown as consisting of an anode of carbon, a cathode of mercury, an electrolyte of chloride of sodium, and line-connections to a dynamo-machine or a primary battery and to the line-conductor.

Our improvements upon this invention consist in the novel construction of the cell and the arrangement of the elements of the battery, whereby we obtain a very large amount of surface contact, and consequently a high degree of electro-motive force or energy.

The essential features of the battery are a suitable cell or case in which are contained a series of vessels or trays separated from each other by stools, each containing a body of mercury; a series of carbon-rods contained within the cell, one of which rods is connected to the wire leading to the generator; a filling of broken carbon surrounding the mercury-receptacles and entering the spaces between them; wires leading from one of the mercury-receptacles to another throughout the series, and joined at the top to the line-conductor, and an electrolytic fluid composed of chloride of sodium.

The invention is illustrated in the accompanying drawings, in which Figure 1 is a vertical sectional view of the entire battery. Fig. 2 is a broken plan view. Fig. 3 is a top view of one of the mercury-trays, the grating being broken away. Fig. 4 is a cross-section of Fig. 3, the netting being removed; and Fig. 5 is a view of one of the supports for the mercury-tray.

In the drawings, A represents the battery-cell, made of stone, earthenware, or other suitable material, and provided with a suitable cover, B. Within this cell is a series of shallow trays or dishes, C, made preferably of the same material as the cell, and adapted to contain a body of mercury, D. Near the top of each tray rests a grating, E, of wood or other similar material, upon which is mounted the stool or support F, Fig. 5. Each tray of the series rests upon one of these stools, as shown, the effect being to separate the mercury-trays and leave a space between them.

G G' are carbon-rods, which pass through the cover B and extend down along the side of the vessel. These rods are connected by similar horizontal rods, H H, and by a wire, I, above the cover.

J is the wire leading from a dynamo-machine or primary battery, and connected to the upper end of the carbon-rod G, which forms the positive pole.

The space not occupied by the parts thus far described is filled with irregularly-broken pieces or blocks of carbon K, which enter also the space between the trays, but are kept from contact with the mercury by the grating. This carbon filling also surrounds the carbon-rods G H, and is in close contact with them.

The electrolytic fluid with which the cell is filled is preferably a solution of sodium chloride, which permeates the mass of carbon, giving a very large surface of contact, as will be evident from the drawings.

The wires by which the current is discharged and each pair of mercury-trays coupled together are shown at L. Each wire extends from the storage element in one tray to the succeeding tray, and, after passing through the cover, are joined in a holder, M, and connected to the line-conductor N, passing through the body of carbon upon one side, as shown in Fig. 2, and being, of course, strongly insulated. The trays may, however, be connected directly by a single wire.

I prefer to place in the bottom of each tray a sheet of wire-netting, O, like that described and claimed in a certain application made by Arthur S. Hickley as sole inventor, and of even date herewith, and the lower end of discharging-wire below the insulated portion is connected to this plate by interlacing, as shown in Fig. 3.

The operation of my device needs no detailed description. When the electric current is introduced, the electrolyte is decomposed and metallic sodium precipitated into each of the mercury-trays, where an amalgam of sodium and mercury is formed upon the netting, which possesses high qualities as a storage element, and the combined power of all the cells gives off a current of very high electro-motive force. This large amount of contact-surface is obtained at no expense of space or room, as the arrangement of the trays in a series, one above the other, is exceedingly compact. It will be seen, too, that there is no waste room in the cell, the entire space being occupied.

Under some circumstances, particularly in small batteries, one of the vertical carbon-rods may be dispensed with, when, of course, the wire I is unnecessary also. In this case the horizontal rods are simply embedded in and supported by the broken carbon or in contact with the wall of the cell.

Having thus described my invention, I claim—

1. The combination, in a secondary battery, of a cell or chamber, a series of trays within such cell, each containing a body of mercury, a filling of broken carbon, an electrolyte of alkaline metal in solution, and line-connections, substantially as described.

2. The combination, in a secondary battery, with the series of mercury-receptacles having the gratings, of the filling of broken carbon and the electrolyte, substantially as described.

3. In a secondary battery, the combination of the mercury-trays, the grating resting therein, the stools or supports for separating the electrodes, the carbon filling, the electrolyte, and line-connections, substantially as described.

4. In a storage-battery, the combination, with the cell A and with line-connections, of the mercury-electrode, the carbon-rods G H, connected together within the cell, and a filling of broken carbon, substantially as described.

Signed at Boston, Massachusetts, this eighth (8th) day of April, 1884.

ARTHUR S. HICKLEY.
WARREN S. HILL.

Witnesses:
R. A. KELLOND,
WM. PORTEOUS.